Oct. 2, 1928. 1,686,045

D. R. TABER

THEFT PREVENTING DEVICE

Filed Jan. 13, 1927

Inventor
David R. Taber

By Eugene D. Stevens
Attorney

Patented Oct. 2, 1928.

1,686,045

UNITED STATES PATENT OFFICE.

DAVID R. TABER, OF WASHINGTON, DISTRICT OF COLUMBIA, ASSIGNOR OF ONE-THIRD TO GEORGE A. MEYERS, OF WASHINGTON, DISTRICT OF COLUMBIA.

THEFT-PREVENTING DEVICE.

Application filed January 13, 1927. Serial No. 160,921.

My invention relates to theft preventing devices, and particularly to such as are designed to prevent the unauthorized removal of the pneumatic tires and rims of motor vehicles.

It is not at all uncommon nowadays for an autoist to find, on returning to his parked car, that a tire thief has methodically jacked up the wheels and made off with the tires and rims. As is well known, the marginal flanged portions of present day rims are sufficiently wide to prevent the tire beads from being slipped thereover without first removing the rim from the felly, breaking the joint and contracting the rim. It is therefore the primary object of this invention to provide a very simple means for effectually locking the rim to the felly, and one which is capable of application to standard felly and rim structures with but slight modification thereof.

The invention also has for an object to furnish a device of this character including a novel rim locking device which is so mounted upon the felly that it cannot be removed without first taking the felly from the wheel.

A still further object of the invention resides in the provision of a device as characterized, which includes means for preventing dirt and foreign matter from passing through the valve stem opening in the felly and reaching the inner tube of the tire.

The foregoing and other objects, which will be apparent as the description proceeds, are attained by means of a novel combination and arrangement of parts to be hereinafter described and claimed, and in order that the same may be readily understood, reference is had to the accompanying drawing forming a part of this specification. While the drawings illustrate the now preferred embodiment of the invention, it is understood that the same is capable of considerable variation and modification without departing from the spirit and scope of the subject matter claimed.

In the drawings, wherein the same reference characters designate the same parts in all views, Figure 1 is a perspective view of a vehicle wheel illustrating the application of my invention thereto;

Figure 1:
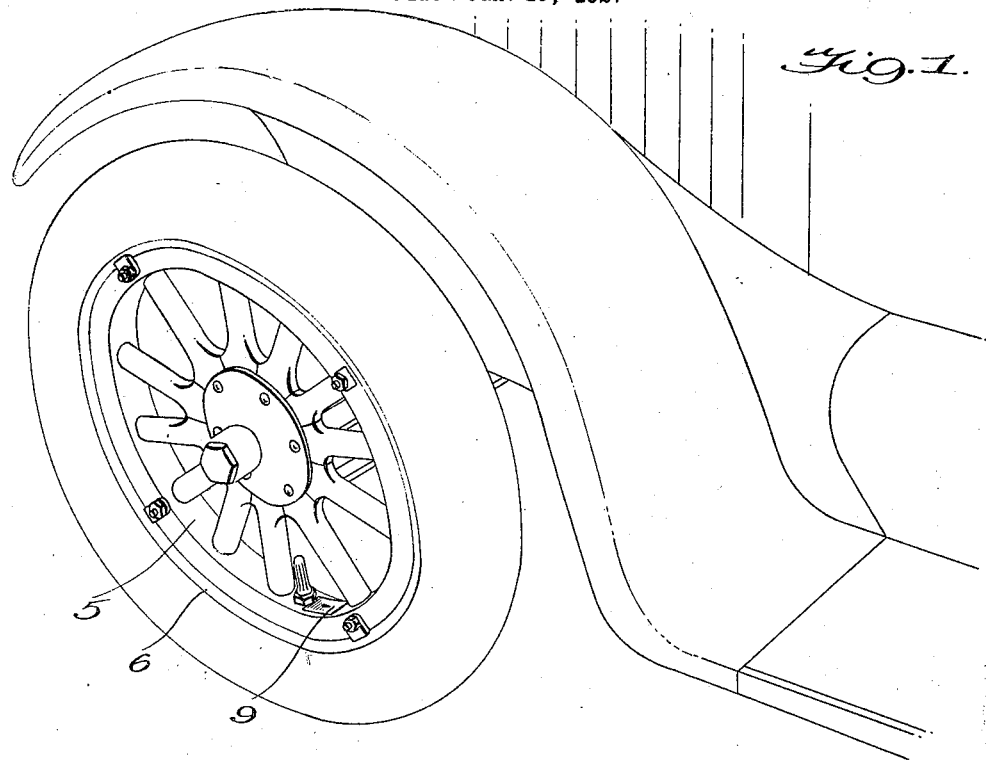

Referring specifically to the drawing, 5 designates the felly and 6, the rim. The felly has the usual hole $5^a$ through which extends the valve stem 8 of the inner tube $8^a$.

Figures 2, 3, 4:
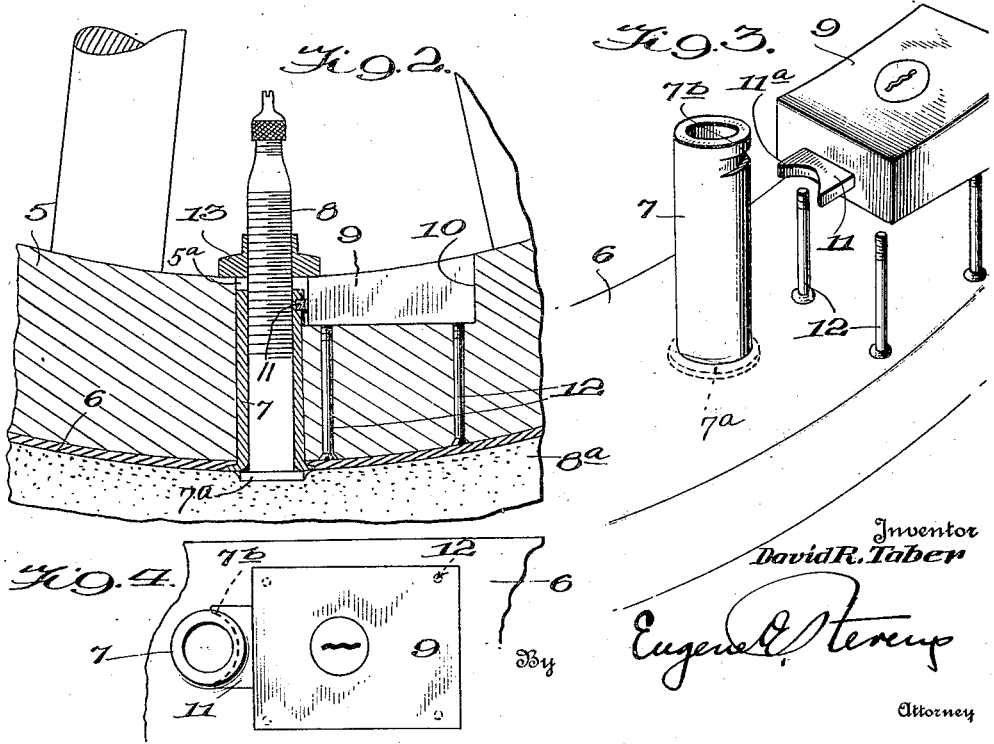
Figure 2 is a fragmentary longitudinal sectional view through a portion of a wheel felly, rim and tire and showing the locking device in operative position.
Figure 3 is a group perspective view of a portion of a rim and certain elements of the locking device.
Figure 4 is a plan view of the parts shown in Figure 2.

As best shown in Figures 2 and 3, the rim 6 is provided with a tubular element 7 which is designed to be inserted through the valve stem hole of the rim and the lower end of the tubular element 7 has a circumferential flange $7^a$ adapted to limit its outward movement. If desired, the tube 7 may be welded or otherwise permanently fastened to the rim. This, however, is optional.

Adjacent its upper end the tube 7 is provided with a transverse arcual groove $7^b$ into which is designed to be inserted the arcually recessed end $11^a$ of the bolt 11 of a lock 9 which is secured in a recess 10 in the inner peripheral surface of the felly 5 by means of screws 12 extending through the felly from the opposite side. Of course other lock fastening means might be availed of,—the important point being that when the rim is in place on the felly the heads of the screws are concealed and cannot be tampered with.

As clearly shown in Figure 2 the valve stem 8 is inserted through the usual rim hole and extends upwardly through the tube 7. It is observed that the tube 7 rather closely engages the valve stem and also the wall of the felly opening $5^a$, thus to exclude dirt and foreign matter which would otherwise tend to pass through the felly hole to the inner tube in the event that the valve stem nut 13 should loosen.

It will be obvious from an inspection of the drawing that the engagement of the lock bolt 11 in the tube groove $7^b$ will effectually prevent the rim from being removed. Inasmuch as the tire cannot be removed from the rim until the rim has been removed from the felly, it will be impossible for anyone to surreptitiously remove a tire in the time and under the conditions which usually obtain.

Having thus described my invention what I claim is:

1. A felly and rim lock comprising a lock casing carried by the felly, fastening elements for holding said casing in place and extending from the rim-engaged surface of said felly to engage said casing whereby said fastening elements will be concealed when the rim is in place on the felly, and said rim having a portion with which the bolt of said lock engages to prevent the rim from being taken off the felly.

2. A felly and rim lock comprising a casing carried by the felly, fastening elements extending into said felly from the rim engaged surface thereof to engage said casing to hold the same in place, said fastening elements being concealed when the rim is in place on said felly, a tubular valve stem-receiving member extending radially from said rim and through a hole in said felly adjacent said casing, a transverse shoulder on said tubular member, and a bolt carried by said lock casing and adapted to engage said shoulder to hold the rim in place on the felly.

3. A felly and rim lock comprising a casing, the felly having an inner surface recess for receiving said casing, fastening elements extending from the outer peripheral surface of said felly and engaging said casing for holding the same in place, said fastening elements being concealed when the felly and rim are assembled, a projection carried by the rim and extending into a radial hole in the felly adjacent said casing, said projection having a lateral shoulder, and a bolt carried by said lock casing and adapted to engage said shoulder to hold the rim and felly assembled.

4. The structure recited in claim 3, and said rim projection being tubular and adapted to receive the valve stem to seal the space between the latter and the wall of said felly hole.

5. A felly and rim lock, comprising a lock casing embedded in the inner peripheral portion of said felly, a tubular member carried by the rim and insertible through the valve stem hole of the felly, said tubular member having communication through said rim and being designed to receive the valve stem, said tubular member having a transverse bolt-receiving shoulder portion, and a bolt associated with said lock inwardly of the inner periphery of the felly and being designed to engage in said shoulder to thereby hold the rim rigidly in place on said felly.

In testimony whereof I affix my signature.

DAVID R. TABER.